US010323680B2

(12) United States Patent
Carabalona

(10) Patent No.: US 10,323,680 B2
(45) Date of Patent: Jun. 18, 2019

(54) CABLE SPLITTER DEVICE, ASSEMBLY, AND METHOD OF USE

(71) Applicant: Southco, Inc., Concordville, PA (US)

(72) Inventor: Eric Carabalona, Kenilworth (GB)

(73) Assignee: Southco, Inc., Concordville, PA (US)

( * ) Notice: Subject to any disclaimer, the term of this patent is extended or adjusted under 35 U.S.C. 154(b) by 71 days.

(21) Appl. No.: 15/447,837

(22) Filed: Mar. 2, 2017

(65) Prior Publication Data

US 2017/0254354 A1 Sep. 7, 2017

Related U.S. Application Data

(60) Provisional application No. 62/303,058, filed on Mar. 3, 2016.

(51) Int. Cl.
*F16C 1/10* (2006.01)
*F16C 1/14* (2006.01)
(Continued)

(52) U.S. Cl.
CPC ............ *F16C 1/101* (2013.01); *E05B 53/005* (2013.01); *E05B 79/20* (2013.01); *F16C 1/106* (2013.01);
(Continued)

(58) Field of Classification Search
CPC .. F16C 1/10; F16C 1/101; F16C 1/102; F16C 1/103; F16C 1/105; F16C 1/106;
(Continued)

(56) References Cited

U.S. PATENT DOCUMENTS

| 4,811,620 A | 3/1989 | Old et al. |
| 2008/0178703 A1* | 7/2008 | Anderson ............... F16C 1/101 74/502.4 |

FOREIGN PATENT DOCUMENTS

| DE | 10008963 C1 | 5/2001 |
| DE | 102009012514 A1 | 9/2010 |

(Continued)

OTHER PUBLICATIONS

Machine Translation of EP 2,400,171, obtained Aug. 23, 2018.*
(Continued)

*Primary Examiner* — Richard W Ridley
*Assistant Examiner* — Brian J McGovern
(74) *Attorney, Agent, or Firm* — RatnerPrestia

(57) ABSTRACT

Cable splitter devices, assemblies, and methods of use are disclosed. A cable splitter device is disclosed. A cable splitter assembly includes a housing, a slider, first cables, and second cables. The housing defines a first number of first slots and a second number of second slots different from the first number. The slider is slidably coupled to the housing. The slider defines the first number of first channels and the second number of second channels. The first cables extend through the first number of first slots and have an end positioned within a respective first channel of the slider. The second cables extend through the second number of second slots and have an end positioned within a respective second channel of the slider. A clipping element may be configured to fix a longitudinal position of a respective first cable at multiple different locations along the first channel.

28 Claims, 14 Drawing Sheets

(51) Int. Cl.
*F16C 1/16* (2006.01)
*E05B 53/00* (2006.01)
*E05B 79/20* (2014.01)
*F16C 1/22* (2006.01)

(52) U.S. Cl.
CPC ................. *F16C 1/14* (2013.01); *F16C 1/16* (2013.01); *F16C 1/22* (2013.01); *F16C 1/223* (2013.01); *F16C 2350/52* (2013.01)

(58) Field of Classification Search
CPC ...... F16C 1/12; F16C 1/20; F16C 1/14; F16C 1/145; F16C 1/16; F16C 1/18; F16C 1/262; F16C 1/26; F16C 1/22; F16C 1/223; F16C 1/226; F16C 2350/52; E05B 53/005; E05B 79/20; B60T 11/046; F16D 2125/60
See application file for complete search history.

(56) References Cited

FOREIGN PATENT DOCUMENTS

| | | | | |
|---|---|---|---|---|
| EP | 2400171 | A1 | 12/2011 | |
| FR | 2922614 | A1 * | 4/2009 | ................ F16C 1/14 |
| GB | 197388 | A | 5/1923 | |
| JP | 4967142 | B2 * | 7/2012 | .............. F16C 1/101 |

OTHER PUBLICATIONS

Machine Translation of JP 4967142, obtained Aug. 28, 2018.*
Machine Translation of FR 2,922,614, obtained Aug. 9, 2018.*
Extended European Search Report for European Application No. 17159004.5, dated Dec. 5, 2017, 10 pages.

* cited by examiner

CABLE SPLITTER DEVICE, ASSEMBLY, AND METHOD OF USE

CROSS REFERENCE TO RELATED APPLICATION

This application claims priority to U.S. Application No. 62/303,058, filed Mar. 3, 2016, the disclosure of this application being incorporated herein by reference in its entirety for all purposes.

FIELD OF THE INVENTION

The present invention relates generally to cable splitters, and particularly, to cable splitter devices, cable splitter assemblies, and methods of using cable splitters.

BACKGROUND OF THE INVENTION

Conventionally, "Bowden" cables are flexible cables used to transmit mechanical force from one location to another. Bowden cables may be used to transmit the force from a mechanical actuator or handle in one location to a component to be actuated (such as a latch or brake) in another location. In certain applications, it may be beneficial to couple the mechanical force from one actuator to multiple components, or vice versa, from multiple actuators to one component to be actuated. Accordingly, improved devices and methods are desired for transmitting mechanical force from one location to multiple locations, or vice versa.

SUMMARY OF THE INVENTION

Aspects of the present invention are related to cable splitter devices, assemblies, and methods of use.

In accordance with one aspect of the present invention, a cable splitter device is disclosed. The cable splitter device includes a housing and a slider. The housing defines an opening and has first and second end surfaces on opposite sides of the opening. The first end surface defines a first number of first slots extending from the opening, and the second end surface defines a second number of second slots extending from the opening different from the first number. The slider is disposed within the housing. The slider is slidably coupled to the housing. The slider has a first end facing the first end surface of the housing and a second end facing the second end surface of the housing. The slider defines the first number of first channels extending from the first end of the slider and the second number of second channels extending from the second end of the slider.

In accordance with another aspect of the present invention, a cable splitter assembly is disclosed. The cable splitter assembly includes a housing, a slider, first cables, and a second cables. The housing defines an opening and has first and second end surfaces on opposite sides of the opening. The first end surface defines a first number of first slots extending from the opening. The second end surface defines a second number of second slots extending from the opening different from the first number. The slider is disposed within the housing. The slider is slidably coupled to the housing. The slider has a first end facing the first end surface of the housing and a second end facing the second end surface of the housing. The slider defines the first number of first channels extending from the first end of the slider and the second number of second channels extending from the second end of the slider. The first cables extend through the first number of first slots. Each first cable has an end positioned within a respective first channel of the slider. The second cables extend through the second number of second slots. Each second cable has an end positioned within a respective second channel of the slider.

In accordance with yet another aspect of the present invention, a method of using a cable splitter is disclosed. The method includes positioning a first number of first cables within respective first slots defined in a first end surface of a housing such that an end of each first cable is positioned within a respective first channel of a slider disposed within and slidably coupled to the housing, positioning a second number of second cables different from the first number within respective second slots defined in a second end surface of the housing opposite the first end surface such that an end of each second cable is positioned within a respective second channel of the slider, and fixing a longitudinal position of the end of each first cable within the respective first channel.

In accordance with still another aspect of the present invention, another cable splitter assembly is disclosed. The cable splitter assembly includes a plurality of cable splitter devices and first and second cables. Each cable splitter device comprises a housing defining one or more first slots in a first end surface and a plurality of second slots in a second end surface opposite the first end surface, and a slider disposed within the housing and slidably coupled to the housing. One or more of the first cables extend through respective ones of the first slots in a first of the plurality of cable splitter devices and are coupled to the slider of the first of the plurality of cable splitter devices. A plurality of the second cables extend through respective ones of the second slots in the first of the plurality of cable splitter devices and are coupled to the slider of the first of the plurality of cable splitter devices. One of the plurality of second cables extends through a first slot of a second of the plurality of cable splitter devices and is coupled to the slider of the second of the plurality of cable splitter devices. Another one of the plurality of second cables extends through a first slot of a third of the plurality of cable splitter devices and is coupled to the slider of the third of the plurality of cable splitter devices.

BRIEF DESCRIPTION OF THE DRAWINGS

The invention is best understood from the following detailed description when read in connection with the accompanying drawings. When a plurality of similar elements are present, a single reference numeral may be assigned to the plurality of similar elements with a small letter designation referring to specific elements. When referring to the elements collectively or to a non-specific one or more of the elements, the small letter designation may be dropped. It is emphasized that, according to common practice, the various features of the drawings are not necessarily to scale. On the contrary, the dimensions of the various features may be arbitrarily expanded or reduced for clarity. Included in the drawings are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The exemplary devices, assemblies, and methods disclosed herein are principally described with respect to cable such as Bowden cables. However, it will be understood by one of ordinary skill in the art that the invention is not so limited. To the contrary, the disclosed embodiments may be usable with any structures employed in the function of transmitting mechanical force from one location to another without departing from the spirit or scope of the present invention.

Figure 1A:
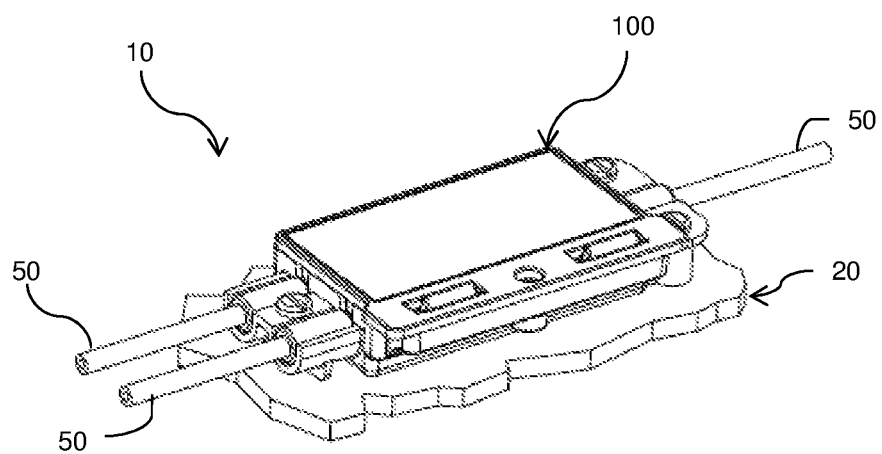
FIGS. 1A-1C depict an exemplary cable splitter assembly including an exemplary cable splitter device and cables in accordance with aspects of the present invention.
Figure 1B:
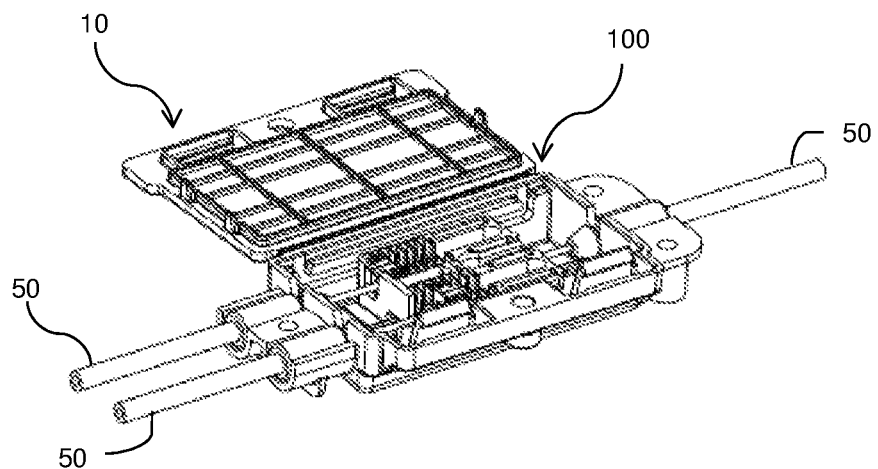
Figure 1C:
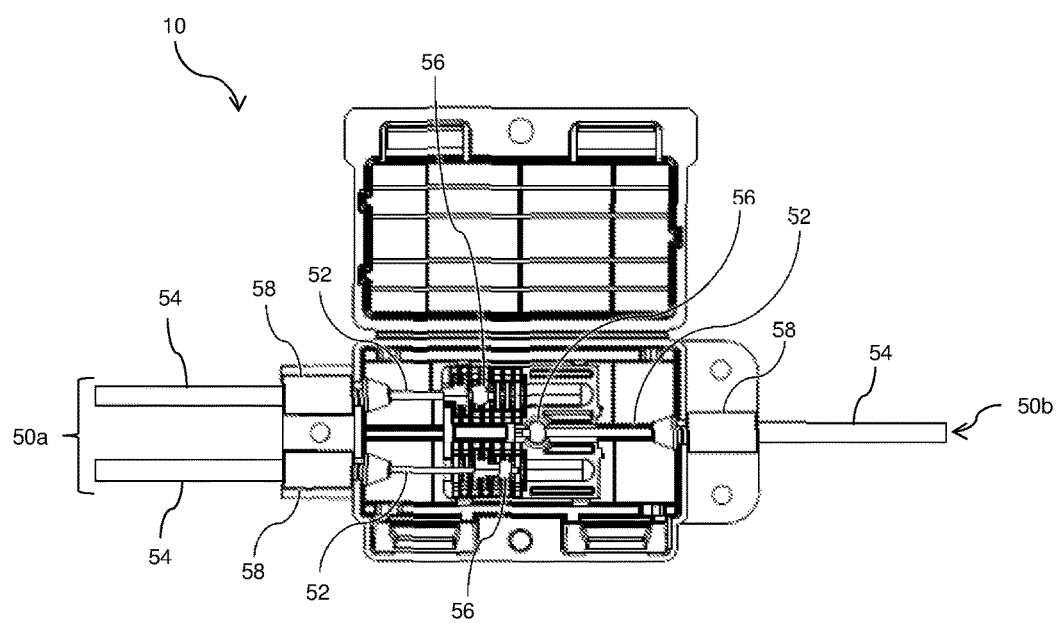

Referring now to the drawings, FIGS. 1A-1C illustrate an exemplary cable splitter assembly 10 in accordance with aspects of the present invention. Assembly 10 includes cables 50 and an exemplary cable splitter device 100. Additional details of assembly 10 are described below.

Cables 50 are configured to transmit mechanical force from one location to another. The number of cables 50 in assembly 10 is dependent on the number of components (e.g., actuators) which will generate the mechanical force, and the number of components (e.g., latches) which will receive the mechanical force. In an exemplary embodiment, assembly 10 includes first number (e.g., two) of first cables 50a, and a second number (e.g., one) of second cables 50b.

It will be understood to one of ordinary skill in the art from the description herein that the number of first cables 50a and the number of second cables 50b may be selected based on the desired application of cable splitter assembly 10, and is not limited. The number of first cables 50a and second cables 50b may be different (e.g., in the case of splitting the force between a number of force generators and force receivers) or may be the same (e.g., in the case of transmitting force from one or more force generator(s) to the same number of force receiver(s) such as in an extender or junction box).

In an exemplary embodiment, cables 50 are Bowden cables. Cables 50 include an inner wire 52 surrounded by an outer housing 54, as shown in FIG. 1C. Inner wire 52 may optionally terminate with a fitting 56 at an end thereof. Outer housing 54 may optionally terminate with a cap 58 which allows inner wire 52 to pass uninterrupted therethrough. Fitting 56 and cap 58 may improve coupling of cable 50 to cable splitter device 100, as will be described in greater detail below.

Figure 8:
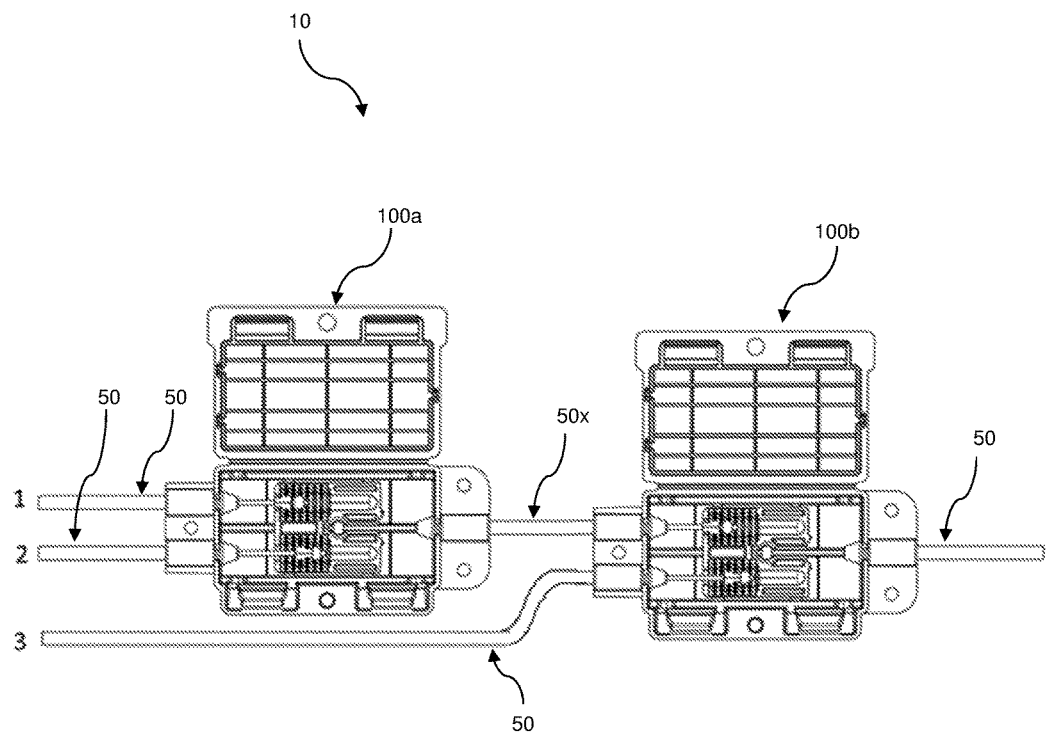
FIG. 8 depicts another exemplary cable splitter assembly including multiple exemplary cable splitter devices and cables in accordance with aspects of the present invention.

Cable splitter device 100 couples cables 50 to one another. While only one cable splitter device 100 is illustrated in FIG. 1A, the invention is not so limited. In an exemplary embodiment, a cable splitter assembly 10 may include a plurality of cable splitter devices 100, with cables 50 coupled between respective devices 100, as shown in FIG. 8. As shown in FIG. 8, a cable 50x may be connected between multiple cable splitter devices 100a and 100b. In this manner, cable splitter assembly 10 may mechanically couple a single component to multiple (e.g. four or more) components through multiple tiers of cable splitter devices 100. When plural cable splitters are employed, they may be assembled in parallel and/or in series with respect to one another, depending on the application and the number and orientation of the cables and force generators and force receivers.

As a general overview, device 100 includes a housing 110, a slider 140, and a clipping element 170. Additional details of device 100 are provided below.

Housing 110 provides a base for cable splitter device 100. As shown in FIGS. 2A-2E, housing 110 defines an opening 112 on its upper side. Opening 112 provides access to the interior of housing 110. Opening 112 is bounded by a pair of end surfaces 114 and 116 on opposite sides of opening 112 and a pair of side surfaces 118 and 120 on opposite sides of opening 112. A bottom surface 122 extends between end surfaces 114 and 116 and side surfaces 118 and 120.

A number of slots 124 are defined in end surface 114, and a number of slots 126 are defined in end surface 116. Slots 124 and 126 extend from opening 112 (e.g. from the top of housing 110) downward toward bottom surface 122. Each slot 124 and 126 may include a detent 128 on one or both sides thereof. First cables 50a extend through slots 124 into the interior of housing 110, and second cables 50b extend through slots 126 into the interior of housing 110. Detents 128 may assist in securing the position of cables 50 within slots 124 and 126, respectively, by engaging or mating with the cap 58 on outer housing 54.

The number of slots 124 corresponds to the first number of first cables 50a used in cable splitter assembly 10 (e.g., two in FIG. 1A). Likewise, the number of slots 126 corresponds to the second number of second cables 50b used in cable splitter assembly 10 (e.g., one in FIG. 1A). As with the number of cables, the number of slots 124 and 126 may be selected based on the desired application of cable splitter assembly 10, and is not limited.

Housing 110 may include support surfaces 130 extending from each slot 124 and 126. Support surfaces 130 support cables 50 in the immediate exterior region of housing 110. In an exemplary embodiment, support surfaces 130 are partially cylindrical surfaces extending outward from slots 124 and 126. Support surfaces 130 are aligned with slots 124 and 126.

Housing 110 may also include mounting surfaces 132 extending around the exterior of housing 110. Mounting surfaces 132 provide an area for mounting housing 110 to another structure, and thereby provide improved stability for cable splitter device 100. In an exemplary embodiment, mounting surfaces 132 include through-holes for screwing or bolting housing 110 to another structure (e.g., surface 20 in FIG. 1A). Other structures for mounting housing 110 to another structure will be known to one of ordinary skill in the art from the description herein.

Figure 2A:
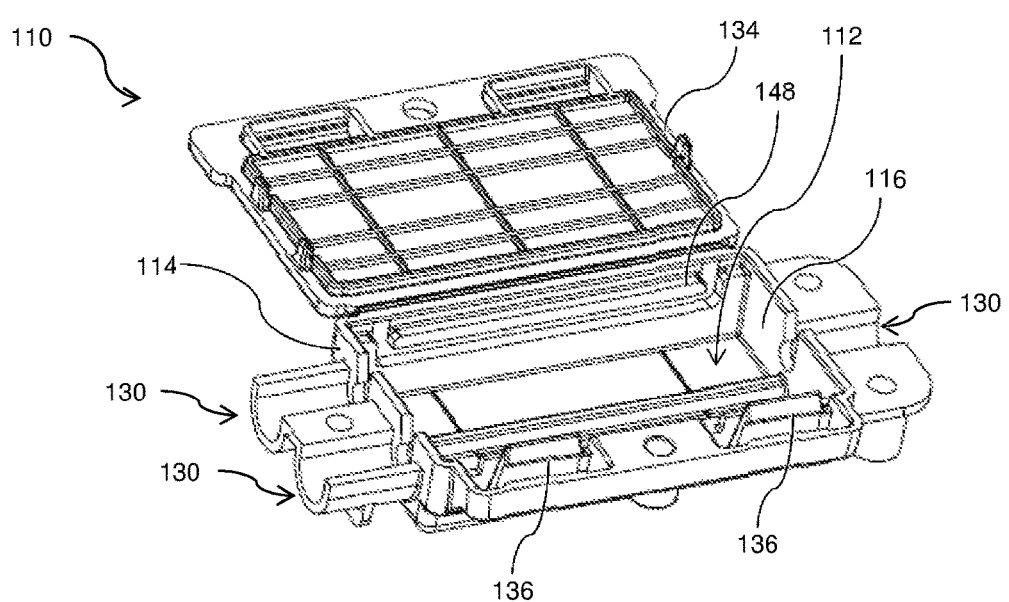
FIGS. 2A-2E depict an exemplary housing of the cable splitter device of FIG. 1A.
Figure 2B:
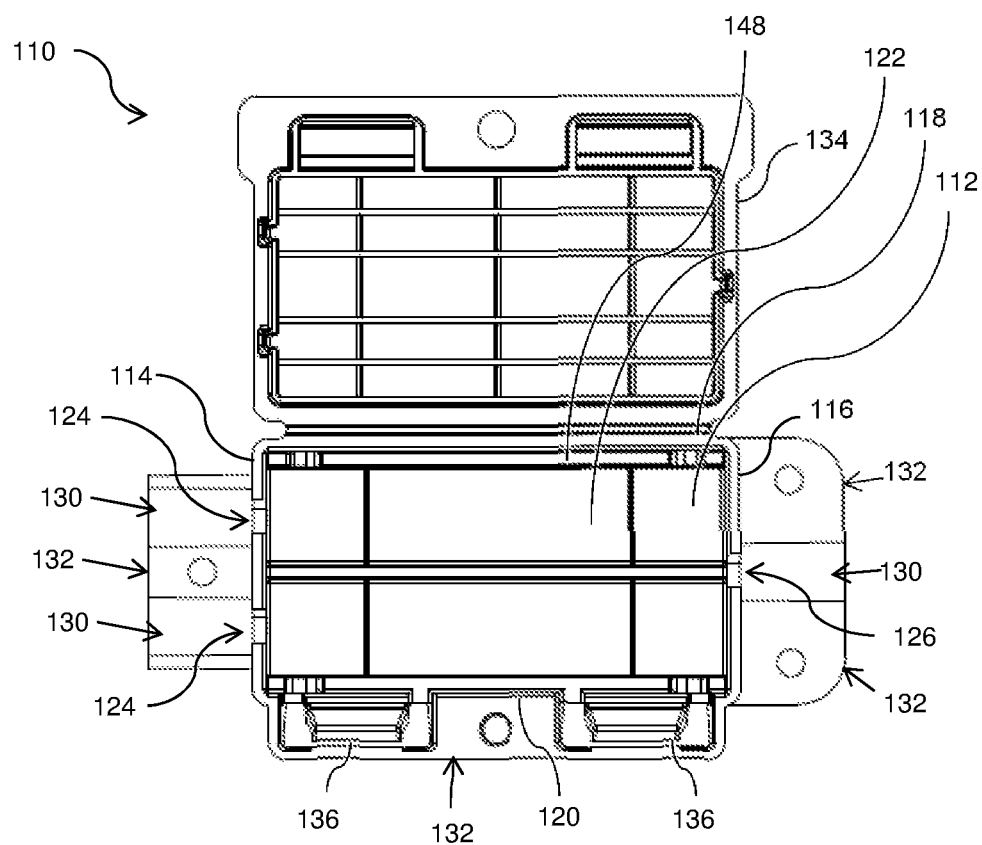
Figure 2C:
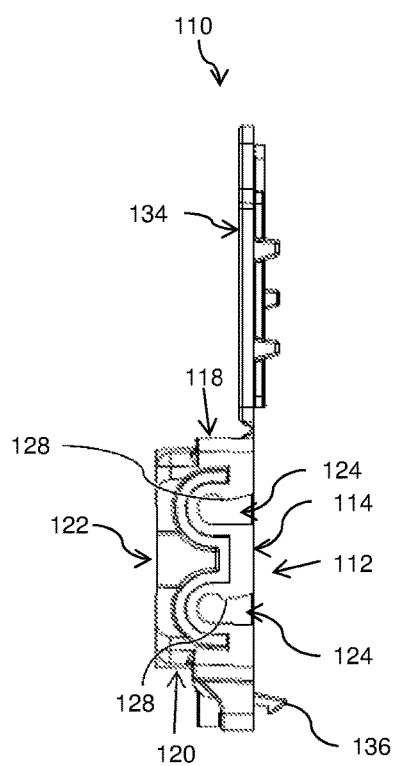
Figure 2D:
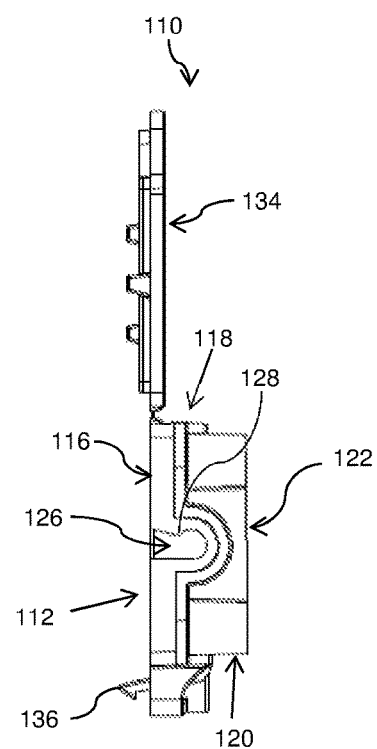
Figure 2E:
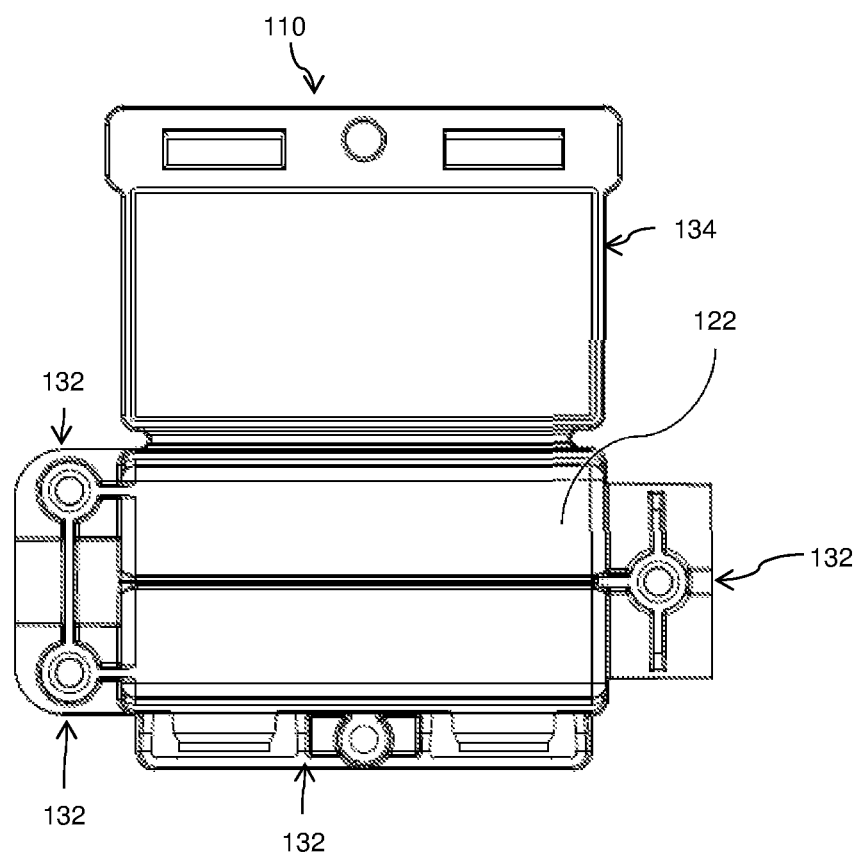

Housing 110 may also include a cover 134. Cover 134 is configured to cover opening 112 in order to keep dust or moisture out of the interior of housing 110. Cover 134 may be attached to housing 110, or may be a component separate from housing 110. In an exemplary embodiment, cover 134 is pivotably connected to housing 110 along an edge of side surface 118. Cover 134 may be connected to housing 110 using a living hinge, as shown in FIG. 2B.

Cover 134 may be sized to create a friction fit with housing 110 to close opening 112. Alternatively, in an exemplary embodiment housing 110 may include one or more latches 136 adjacent side surface 120. Latches 136 secure cover 134 in a closed position (shown in FIG. 1A). Suitable structures for use as latches 136 will be known for one of ordinary skill in the art from the description herein.

Slider 140 is disposed within housing 110. Slider 140 is slidably coupled to housing 110. In an exemplary embodiment, slider 140 is slidably coupled to a rail 142 within housing 110. Rail 142 extends along bottom surface 122 of housing 110 in a direction from end surface 114 toward end surface 116, as shown in FIG. 2B. Slider 140 includes a groove 144 in an underside thereof sized to mate with and slide along rail 142.

Additionally, slider 140 may include a pair of tabs 146 on either side thereof. Tabs 146 extend outwardly from slider 140 toward side surfaces 118 and 120 of housing 110. Side surfaces 118 and 120 include respective ridges 148 extending into the interior of housing 110. Each tab 146 slides along the underside of a respective ridge 148. Ridges 148 thereby prevent slider 140 from moving upward through opening 112, and maintain slider 140 within housing 110 and engaged with rail 142.

In one embodiment, rail 142 may be offset within housing 110, and/or tabs 146 may project different distances (or have different sizes) relative to slider 140. These structural differences in dimension may be provided to ensure proper orientation of slider 140 within housing 110. In other words, rail 142 may be positioned and/or tabs 146 may be sized such that slider 140 can only be installed in housing 110 in a single correct orientation.

As shown in FIGS. 3A-3F, slider 140 has a first end 150 facing end surface 114 of housing 110, and a second end 152 facing end surface 116 of housing 110. Slider 140 includes a number of channels 154 extending inward from first end 150, and a number of channels 156 extending inward from second end 152. The ends of first cables 50a are positioned within respective channels 154, and the ends of second cables 50b are positioned within respective channels 156. Channels 154 are aligned with slots 124 in end surface 114, and channels 156 are aligned with slots 126 in end surface 116, so that first cables 50a and second cables 50b do not include any bends within the interior of housing 110.

As with slots 124 and 126, the number of channels 154 corresponds to the first number of first cables 50a used in cable splitter assembly 10 (e.g., two in FIG. 1A). Likewise, the number of channels 156 corresponds to the second number of second cables 50b used in cable splitter assembly 10 (e.g., one in FIG. 1A). As with the number of cables and slots, the number of channels 154 and 156 may be selected based on the desired application of cable splitter assembly 10, and is not limited.

Channels 154 and 156 in slider 140 are provided for securing the ends of cables 50. As will be described below with respect to the exemplary embodiments in the drawings, channels 154 may be provided for adjustably securing cables 50, and channels 156 may be provided for fixedly securing cables 50. However, it will be understood by one of ordinary skill in the art that the invention is not so limited. To the contrary, the following features of channels 154 may additionally or alternatively be incorporated into channels 156, and the following features of channels 156 may additionally or alternatively be incorporated into channels 154.

In an exemplary embodiment, each channel 154 includes a plurality of detents 158 spaced out along the length of channel 154. Detents 158 define recesses therebetween for receiving clipping element 170. Detents 158 delineate multiple different locations within channel 154 for fixing cable 50 with clipping element 170, as will be discussed in greater detail below.

In another exemplary embodiment, each channel 156 includes a fixing barrier 160. Barrier 160 is configured to directly engage with and fix a cable 50 within channel 156 by blocking longitudinal movement of cable 50 out of channel 154. For one example, barrier 160 may frictionally engage cable 50 to prevent longitudinal movement of cable 50. Alternatively or additionally, barrier 160 may block longitudinal movement of fitting 56 out of channel 156.

Figure 3A:
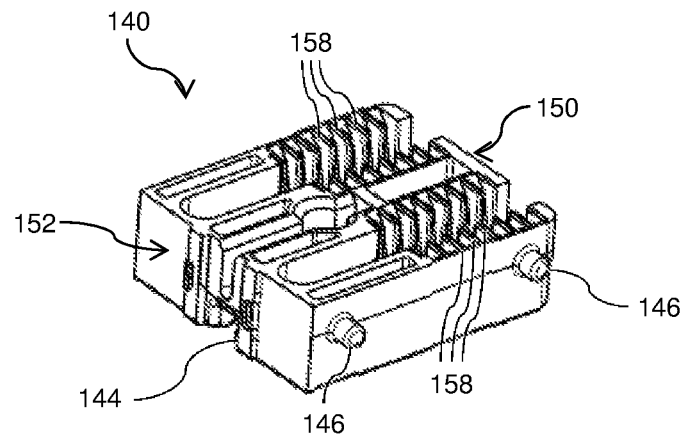
FIGS. 3A-3F depict an exemplary slider of the cable splitter device of FIG. 1A.
Figure 3B:
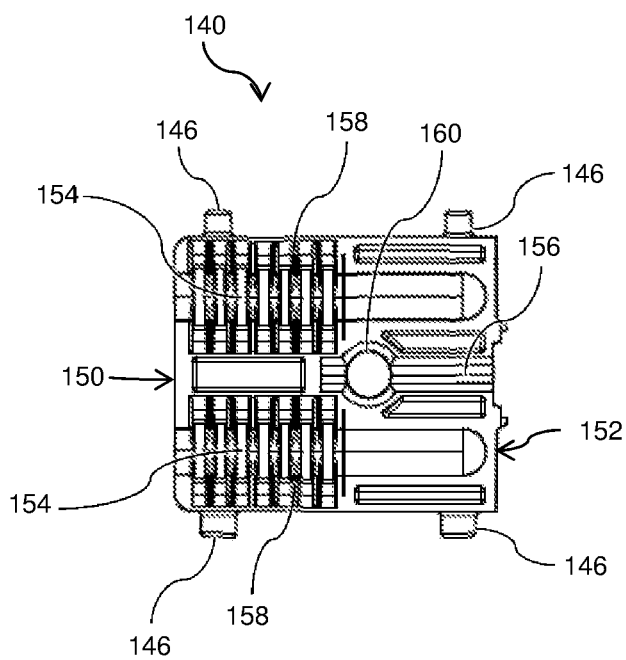
Figure 3C:
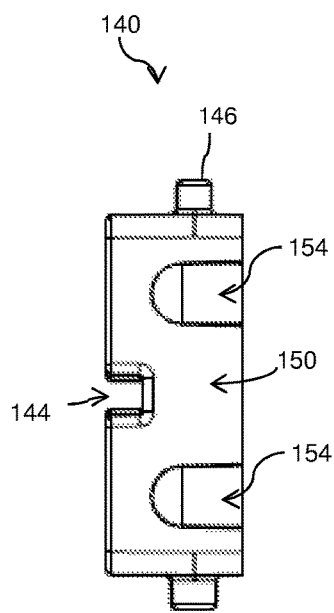
Figure 3D:
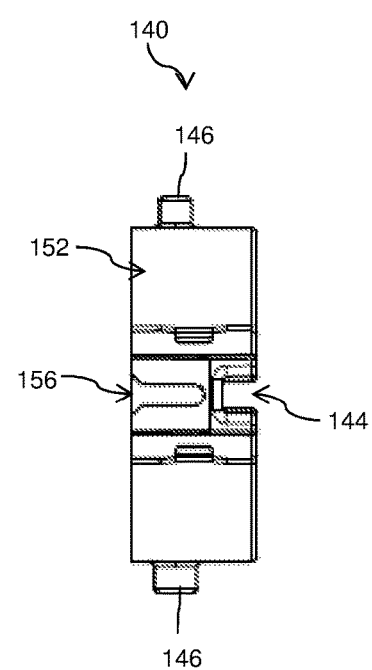
Figure 3E:
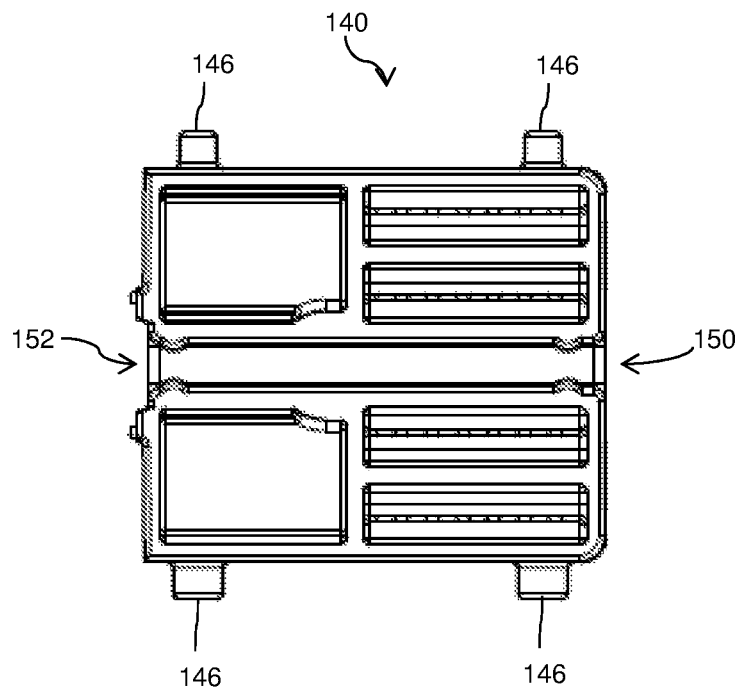
Figure 3F:
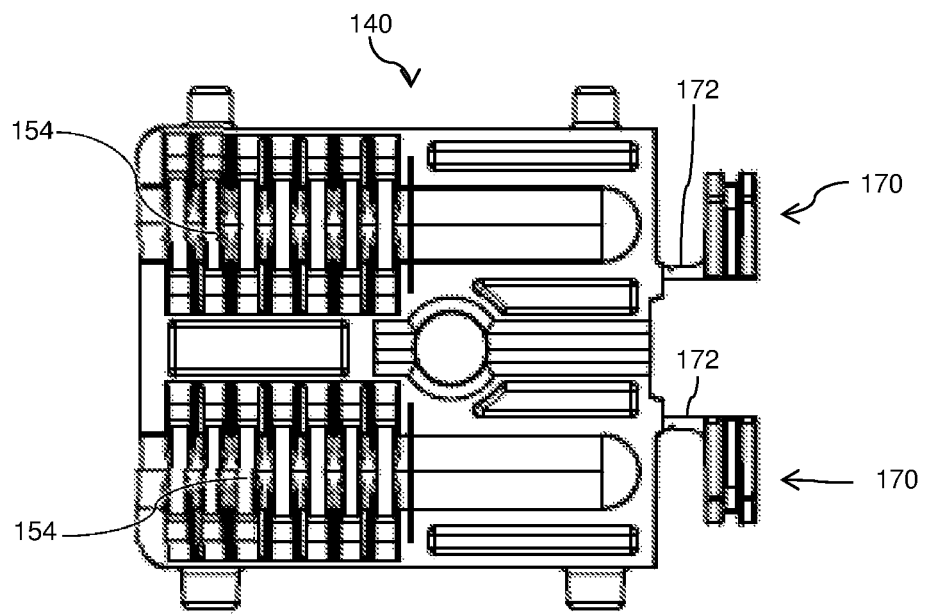

A clipping element 170 is associated with each channel 154 of slider 140. Prior to use, clipping element 170 may be coupled to slider 140 via a breakable limb 172, as shown in FIG. 3F. In use, clipping element 170 engages with a respective channel 154 to fix a longitudinal position of cable 50 within channel 154. Clipping element 170 is configured to fix a longitudinal position of cable 50 within channel 154 at multiple different locations along the length of channel 154.

Figure 4A:
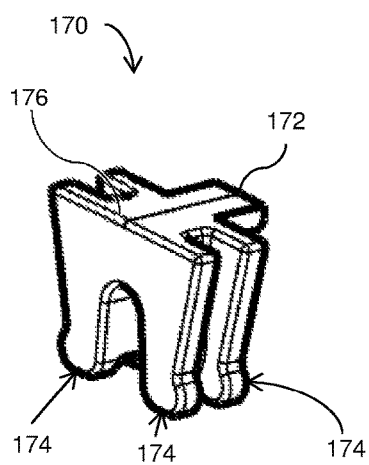
FIGS. 4A-4C depict an exemplary clipping element of the cable splitter device of FIG. 1A.
Figure 4B:
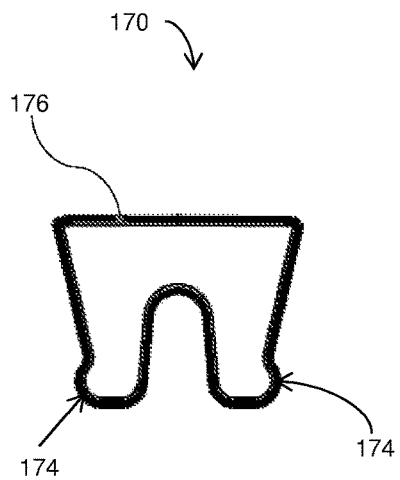
Figure 4C:
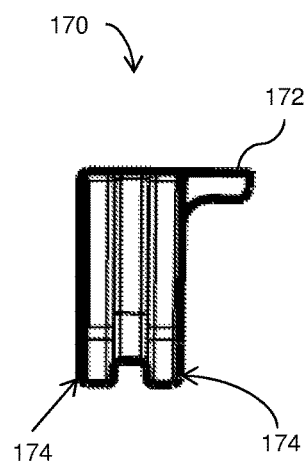

Clipping element 170 fixes cable 50 by blocking longitudinal movement of cable 50 within channel 154, and by preventing movement of cable 50 outward through the top of channel 154 (e.g., through the top of slider 140). As shown in FIGS. 4A-4C, clipping element 170 may include a pair of legs 174 which frictionally engage cable 50 to prevent longitudinal movement of cable 50.

Alternatively or additionally, legs 174 may prevent longitudinal movement of cable 50 by blocking longitudinal movement of fitting 56 out of channel 154. Still further, clipping element 170 may include a bridge 176 which prevents movement of cable 50 outward through the top of channel 154. Other structures incorporated into clipping element 170 for fixing the longitudinal position of cable 50 will be apparent to one of ordinary skill in the art from the description herein.

In an exemplary embodiment, clipping element 170 is configured to engage one or more of the plurality of detents 158 within each channel 154. The pair of legs 174 of clipping element may be configured to engage within the recesses defined by detents 158 to fix the positon of cable 50. To this end, clipping element 170 may include multiple sets of legs 174 on each side of channel 154 to create a more stable and reliable fixation of cable 50 within channel 154. The location at which clipping element 170 fixes the position of cable 50 within channel 154 may be selected by choosing the appropriate detents 158 to engage with clipping element 170, as will be described in greater detail below.

An exemplary method of using cable splitter device 100 is described below with respect to FIGS. 5A-7 in accordance with aspects of the present invention.

Figure 5A:
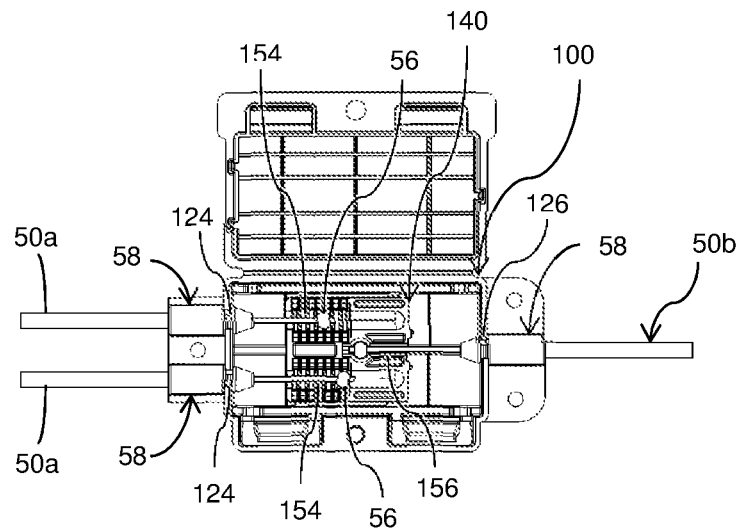
FIGS. 5A and 5B depict a positioning step of an exemplary method of using a cable splitter in accordance with aspects of the present invention.
Figure 5B:
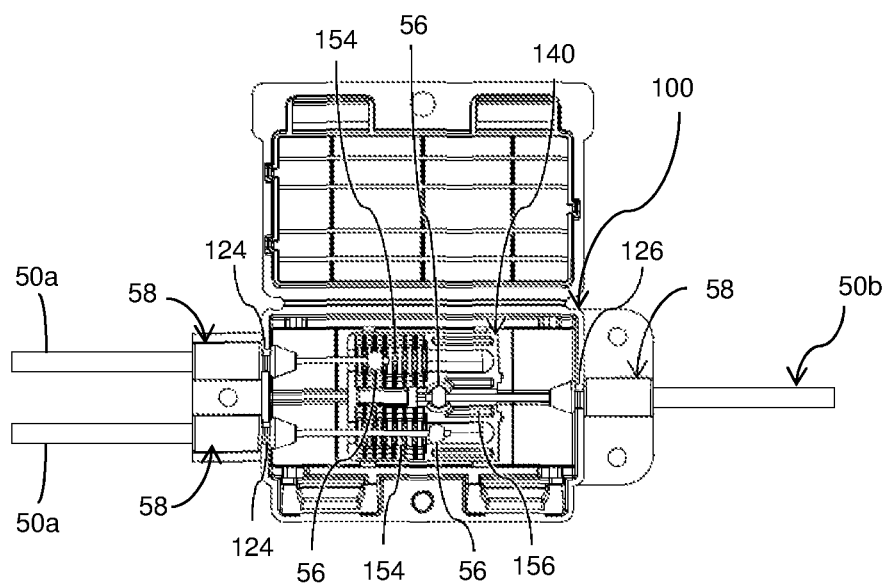

As shown in FIGS. 5A and 5B, cables 50 are positioned within cable splitter device 100. Cables 50a are positioned within slots 124 such that ends of cables 50a are positioned within respective channels 154 of slider 140. Where cables 50a include caps 58, each cap 58 may engage with a corresponding detent 128 in slot 124 to secure the cable 50a within the slot. Likewise, cables 50b are positioned within slots 126 such that ends of cables 50b are positioned within respective channels 156 of slider 140. Where cables 50b include caps 58, each cap 58 may engage with a corresponding detent 128 in slot 126 to secure the cable 50b within the slot. During or as a result of this positioning, cables 50 and/or caps 58 may be supported by support surfaces 130 extending outward from slots 124 and 126.

In accordance with aspects of the present invention, the positioning of the ends of each cable 50 relative to the position of slider 140 may be important to ensure proper transmission of mechanical force via cable splitter device 100. Accordingly, the above positioning steps may include positioning the end of each cable 50a within a predetermined longitudinal range within a respective channel 154.

The predetermined range within each channel 154 may be visually indicated on slider 140, in order to assist a user of cable splitter device 100 in the proper positioning of cables 50a within channels 154. For example, it may be beneficial to avoid positioning the end of each cable 50a too close to either end of a respective channel 154, as such positioning may inhibit proper fixing of the longitudinal position of the cable 50a by clipping element 170. In an exemplary embodiment, the predetermined longitudinal range may be a predetermined minimum distance from each end of the respective channel 154. The predetermined distance may be the same from each end, or may be a different distance from each end.

In accordance with this exemplary embodiment, FIG. 5A illustrates an example of positioning of the ends within the predetermined range in channel 154, while FIG. 5B illustrates an example of positioning of the ends outside of the predetermined range in channel 154. As shown in FIG. 5B, fittings 56 on each cable 50a are positioned too far to the left or right in channels 154, at positions which inhibit proper fixing by clipping element 170.

In accordance with other aspects of the present invention, the positioning of slider 140 within housing 110 may be important to ensure proper transmission of mechanical force via cable splitter device 100. Accordingly, the above positioning steps may include sliding slider 140 to a position that is within a predetermined range within housing 110.

The predetermined range within housing 110 may be visually indicated on bottom surface 122 of housing 110, in order to assist a user of cable splitter device 100 in the proper positioning of slider 140 within housing 110. For example, it may be beneficial to avoid positioning slider 140 too close to either end surface 114 and 116 of housing 110, as such positioning may inhibit full movement of slider 140 during a mechanical actuating of cables 50.

Figure 6A:
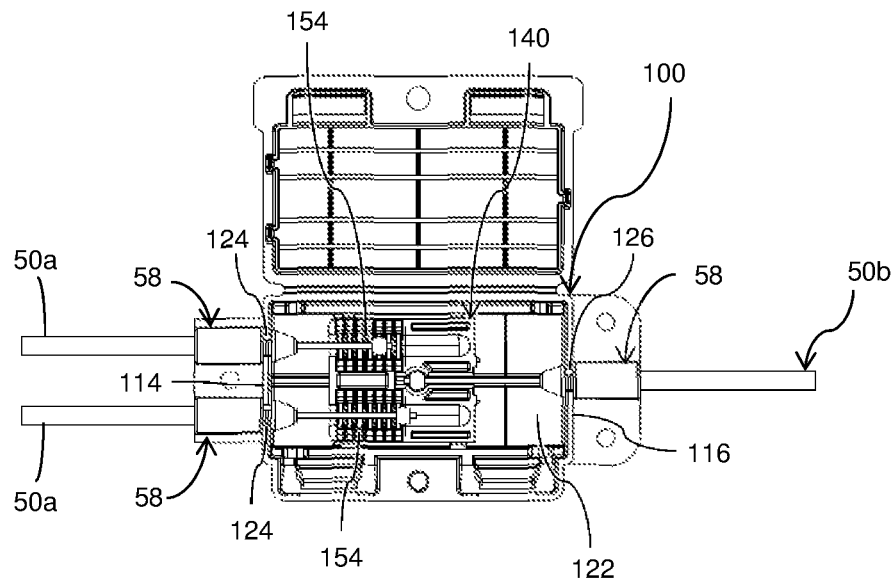
FIGS. 6A and 6B depict a sliding step of an exemplary method of an exemplary method of using a cable splitter in accordance with aspects of the present invention.
Figure 6B:
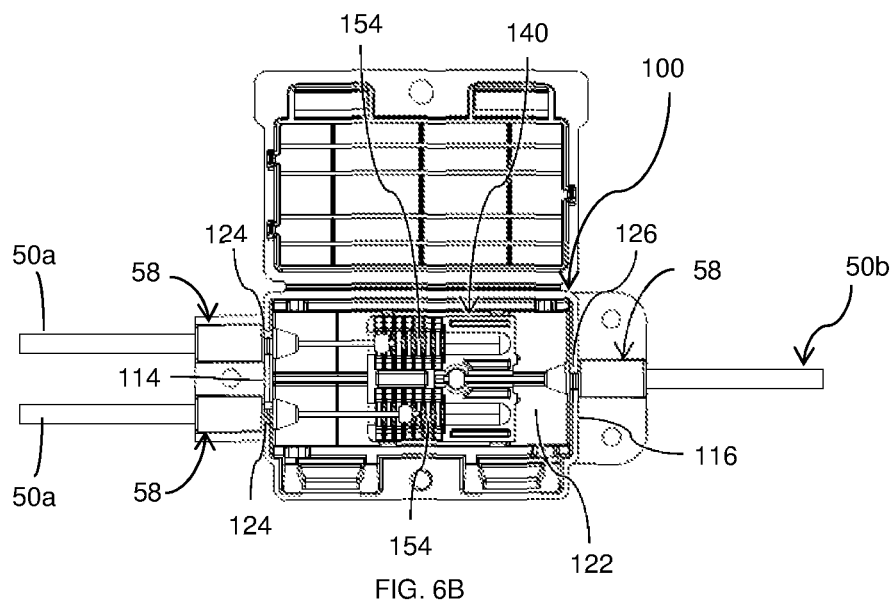

In an exemplary embodiment, the predetermined range of slider 140 may be a predetermined minimum distance from end surfaces 114 and 116. The predetermined distance may be the same from each end surface 114 and 116, or may be a different distance from each end surface 114 and 116. In accordance with this exemplary embodiment, FIGS. 6A and 6B illustrate examples of positioning of slider 140 outside of the predetermined range in housing 110. As shown in FIG. 6A, slider 140 is positioned too far to the left; and in FIG. 6B, slider 140 is positioned too far to the right.

Figure 7:
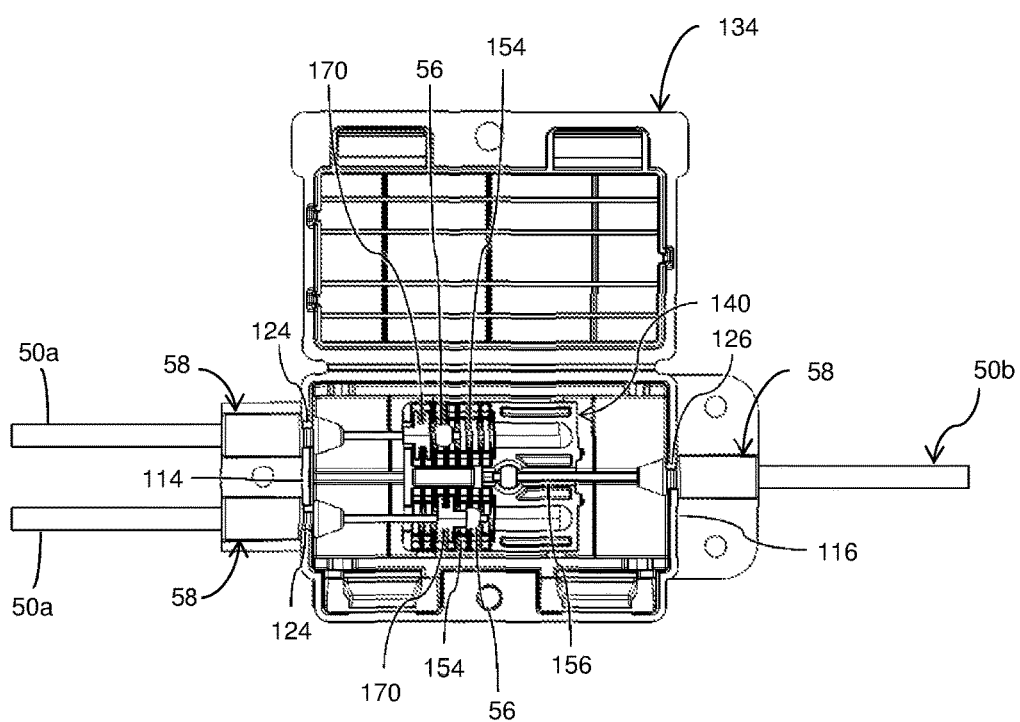
FIG. 7 depicts a fixing step of an exemplary method of using a cable splitter in accordance with aspects of the present invention.

After the ends of cables 50 are properly positioned within channels 154 and 156 of slider 140, and slider 140 is properly positioned within housing 110, the longitudinal positions of the ends of cables 50a are fixed. As shown in FIG. 7, when slider 140 is positioned within the predetermined range, clipping element 170 is engaged with channels 154 to fix the longitudinal position of the ends of cables 50a. In an exemplary embodiment, legs 174 of each clipping element 170 are engaged in the recesses between adjacent detents 128 to fix the position of clipping element 170 relative to channel 154. Clipping element 170 thereby fixes the position of cable 50a within channel 154, e.g., by obstructing movement or frictionally fixing the end of cable 50a.

After the longitudinal position of cables 50a has been fixed, the method may include covering the opening 112 in housing 110. In an exemplary embodiment, opening 112 is covered by pivoting cover 134 around its hinge to a closed position in which cover 134 is secured by latches 136.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A cable splitter device comprising:
a housing defining an opening and having a first end surface and a second end surface on opposite sides, respectively, of the opening, the first end surface defining at least two first slots extending from the opening, the second end surface defining at least one second slot extending from the opening; and
a slider disposed within the housing, the slider slidably coupled to the housing, the slider having a first end facing the first end surface of the housing and a second end facing the second end surface of the housing, the slider defining at least two first channels extending from the first end of the slider and at least one second channel extending from the second end of the slider,
wherein each of the at least two first channels includes a respective clipping element, a respective center of each respective clipping element being positionable at a respective multiple different locations along a respective length of a respective one of the at least two first channels to fix a respective longitudinal position of a respective cable within the respective one of the at least two first channels.

2. The cable splitter device of claim 1, wherein the housing comprises a plurality of partially cylindrical surfaces extending outward from the at least two first slots and at least one second slot.

3. The cable splitter device of claim 1, wherein the housing comprises a cover configured to cover the opening.

4. The cable splitter device of claim 3, wherein the cover is pivotably connected to the housing.

5. The cable splitter device of claim 4, wherein the cover is pivotably connected to the housing using a living hinge.

6. The cable splitter device of claim 1, wherein the housing comprises a rail extending in a direction from the first end surface toward the second end surface, the slider slidably coupled to the rail of the housing.

7. The cable splitter device of claim 1, wherein each of the at least two first channels is aligned with a respective one of the at least two first slots, and the at least one second channel is aligned with the at least one second slot.

8. The cable splitter device of claim 1, wherein each of the at least two channels comprises a respective plurality of detents arranged at the respective multiple different locations along the respective length of the respective one of the at least two first channels, and the respective clipping element is configured to engage a respective one or more of the respective plurality of detents to fix the respective longitudinal position of the respective cable within the respective one of the at least two first channels at the respective multiple different locations.

9. The cable splitter device of claim 1, wherein the at least one second channel comprises a fixing barrier configured to fix a longitudinal position of a cable within the at least one second channel.

10. A cable splitter assembly comprising:
a housing defining an opening and having a first end surface and a second end surface on opposite sides, respectively, of the opening, the first end surface defining at least two first slots extending from the opening, the second end surface defining at least one second slot extending from the opening;
a slider disposed within the housing, the slider slidably coupled to the housing, the slider having a first end facing the first end surface of the housing and a second end facing the second end surface of the housing, the slider defining at least two first channels extending from the first end of the slider and at least one second channel extending from the second end of the slider;
at least two first cables each extending through a respective one of the at least two first slots, each of the at least two first cables having a respective end positioned within a respective one of the at least two first channels of the slider; and
at least one second cable extending through the at least one second slot, the at least one cable having an end positioned within the at least one second channel of the slider,
wherein each of the at least two first channels includes a respective clipping element, a respective center of each respective clipping element being positionable at a respective multiple different locations along a respective length of a respective one of the at least two first channels to fix a respective longitudinal position of a respective one of the at least two first cables within the respective one of the at least two first channels.

11. The cable splitter assembly of claim 10, wherein the housing comprises a plurality of partially cylindrical surfaces extending outward from the at least two first slots and at least one second slot, each of the plurality of partially cylindrical surfaces supporting a respective one of the at least two first cables and the at least one second cable.

12. The cable splitter assembly of claim 10, wherein the housing comprises a cover configured to cover the opening.

13. The cable splitter assembly of claim 12, wherein the cover is pivotably connected to the housing.

14. The cable splitter assembly of claim 13, wherein the cover is pivotably connected to the housing using a living hinge.

15. The cable splitter assembly of claim 10, wherein the housing comprises a rail extending in a direction from the first end surface toward the second end surface, the slider slidably coupled to the rail of the housing.

16. The cable splitter assembly of claim 10, wherein each of the at least two first channels is aligned with a respective one of the at least two first slots, and the at least one second channel is aligned with the at least one second slot.

17. The cable splitter assembly of claim 10, wherein each of the at least two first channels comprises a respective plurality of detents arranged at the respective multiple different locations along the respective length of the respective one of the at least two first channels, and the respective clipping element is configured to engage a respective one or more of the respective plurality of detents to fix the respective longitudinal position of the respective end of the respective one of the at least two first cables within the respective one of the at least two first channels the respective multiple different locations.

18. The cable splitter assembly of claim 10, wherein the at least one second channel comprises a fixing barrier configured to fix the end of the at least one second cable within the at least one second channel.

19. A method of splitting cables comprising:
positioning a first cable within a first slot defined in a first end surface of a housing such that an end of the first cable is positioned within a first channel of a slider disposed within and slidably coupled to the housing;
positioning a second cable within a second slot defined in a second end surface of the housing opposite the first end surface such that an end of the second cable is positioned within a second channel of the slider; and
fixing a longitudinal position of the end of the first cable within the first channel by engaging a center of a clipping element at a first location along a length of the first channel; and
fixing another longitudinal position of the end of the first cable within the first channel by engaging the center of the clipping element at a second location along the length of the first channel different from the first location.

20. The method of claim 19, further comprising supporting the first and second cables with partially cylindrical surfaces extending outward from each of the first and second slots.

21. The method of claim 19, further comprising covering an opening between the first and second end surfaces.

22. The method of claim 21, further comprising covering the opening by pivoting a cover pivotably connected to the housing.

23. The method of claim 19, further comprising sliding the slider to a position within a predetermined range of positions within the housing prior to fixing the longitudinal position of the end of the first cable.

24. The method of claim 23, wherein the predetermined range of the slider is a predetermined minimum distance from the first end surface and a predetermined minimum distance from the second end surface.

25. The method of claim 19, wherein the fixing comprises engaging one or more detents of the first channel with the clipping element at the first location.

26. The method of claim 19, wherein the positioning comprises positioning the end of the first cable within a predetermined longitudinal range within the first channel.

27. The method of claim 26, wherein the predetermined longitudinal range is a predetermined minimum distance from an end of the first channel.

28. A cable splitter assembly comprising:
a plurality of cable splitter devices according to claim 1; and
at least one cable connected between respective ones of the plurality of cable splitter devices.

* * * * *